United States Patent
Hao et al.

(10) Patent No.: US 7,716,227 B1
(45) Date of Patent: May 11, 2010

(54) VISUALLY REPRESENTING SERIES DATA SETS IN ACCORDANCE WITH IMPORTANCE VALUES

(75) Inventors: Ming C. Hao, Palo Alto, CA (US); Umeshwar Dayal, Saratoga, CA (US); Daniel Keim, Steisslingen (DE); Toblas Schreck, Constance (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 978 days.

(21) Appl. No.: 11/266,162

(22) Filed: Nov. 3, 2005

(51) Int. Cl.
G06F 7/00 (2006.01)
G06F 17/30 (2006.01)
G06F 17/18 (2006.01)
G06F 19/00 (2006.01)
G06F 11/30 (2006.01)
G06F 17/27 (2006.01)

(52) U.S. Cl. ................ 707/748; 345/418; 345/619; 702/176

(58) Field of Classification Search .............. 707/7; 345/418, 619; 715/271, 781, 798, 800, 806; 382/276; 702/176
See application file for complete search history.

(56) References Cited

U.S. PATENT DOCUMENTS

| | | | |
|---|---|---|---|
| 5,581,797 A | 12/1996 | Baker et al. | |
| 5,623,590 A | 4/1997 | Becker et al. | |
| 5,634,133 A | 5/1997 | Kelley | |
| 5,659,768 A | 8/1997 | Forbes et al. | |
| 5,801,688 A | 9/1998 | Mead et al. | |
| 5,929,863 A | 7/1999 | Tabei et al. | |
| 5,986,673 A | 11/1999 | Martz | |
| 6,211,880 B1 | 4/2001 | Impink, Jr. | |
| 6,269,325 B1 | 7/2001 | Lee et al. | |
| 6,400,366 B1 | 6/2002 | Davies et al. | |
| 6,429,868 B1 * | 8/2002 | Dehner et al. | 345/440 |
| 6,727,926 B1 | 4/2004 | Utsuki et al. | |
| 7,051,284 B2 * | 5/2006 | Uemura et al. | 715/752 |
| 7,221,474 B2 | 5/2007 | Hao et al. | |
| 7,567,250 B2 | 7/2009 | Hao et al. | |
| 2002/0118193 A1 | 8/2002 | Halstead, Jr. | |
| 2003/0071815 A1 | 4/2003 | Hao et al. | |
| 2003/0152288 A1 * | 8/2003 | Balmelli et al. | 382/276 |
| 2004/0183815 A1 * | 9/2004 | Ebert | 345/619 |
| 2006/0059439 A1 * | 3/2006 | Hao et al. | 715/805 |
| 2006/0095858 A1 | 5/2006 | Hao et al. | |
| 2007/0101268 A1 * | 5/2007 | Hua et al. | 715/721 |
| 2009/0033664 A1 | 2/2009 | Hao et al. | |

OTHER PUBLICATIONS

D. Keim et al Pixel Bar Charts: A New Technique for Visualization Large Multi-Attribute Data Sets with Aggregation:, HP Technical Report, Apr. 2001, pp. 1-10.

M. Ankerst et al "Towards an effective cooperation of the computer and the computer user for classification, Proc. 6th Int. Conf. on Knowledge Discovery and Data Mining ," (KDD'2000), Aug. 20-23, 2000, Boston, MA, 2000, pp. 1-10.

(Continued)

*Primary Examiner*—James Trujillo
*Assistant Examiner*—Bruce M Moser

(57) ABSTRACT

A method comprises determining an importance value for each series data set among a plurality of series data sets and visually representing each of the series data sets in accordance with the importance values.

37 Claims, 5 Drawing Sheets

OTHER PUBLICATIONS

M.C. Hao et al "Visual Mining of E-customer Behavior Using Pixel Bar Charts,", HP Technical Report, Jun. 20, 2001, pp. 1-7.

B. Shneiderman, "Tree Visualization with Treemaps: a 2-D Space-Filling Approach", pp. 1-10, Jun. 1991.

D. Keim et al "Hierarchical Pixel Bar Charts", IEEE Transactions on Visualization and Computer Graphics, vol. 8, No. 3, Jul.-Sep. 2002, pp. 255-269.

Daniel Keim et al "Designing Pixel-Orientated Visualization Techniques: Theory and Applications" IEEE Transactions on Visualization and Computer Graphics, vol. 6, No. 1, Jan.-Mar. 2000, pp. 59-78.

U.S. Appl. No. 11/076,700 entitled "A Method and System for Creating Visualizations" filed Mar. 10, 2005, pp. 1-31.

U.S. Appl. No. 11/523,240 entitled "Time Relevance-Based Visualization of Data" filed Sep. 19, 2006, pp. 1-22.

* cited by examiner

VISUALLY REPRESENTING SERIES DATA SETS IN ACCORDANCE WITH IMPORTANCE VALUES

BACKGROUND

Data, particularly large amounts of data, is easy to show on a display, but often difficult to interpret. For example, sales data from an international corporation may comprise sales of many products sold in many regions across the globe. Displaying the data in a way that facilitates human interpretation of the data can be different.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, various companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "series data" refers to a data set that comprises at least one, and in some embodiments two or more, data values that are a function of an independent variable (e.g., sales volume versus time). The independent variable can be time or other variables.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In accordance with embodiments of the invention, series data is graphically displayed in a way that emphasizes the importance of various portions of the data. That is, some data may be considered, for any one of a variety of reasons, more important than other data. What is considered important generally varies from data set to data set and/or from person to person. In general, data considered to be more important is graphically set apart from less important data to permit a person viewing the data on, for example, a display to quickly determine which data is more important. An example is discussed below in conjunction with embodiments of the invention. The example is of sales data regarding products sold in various geographic regions of the world. Embodiments of the invention, however, apply to any type of data including, without limitation, stock prices, sales of services, etc. The examples described herein of series data comprise time series data, but in general the data need not be a function of time.

Figure 1:
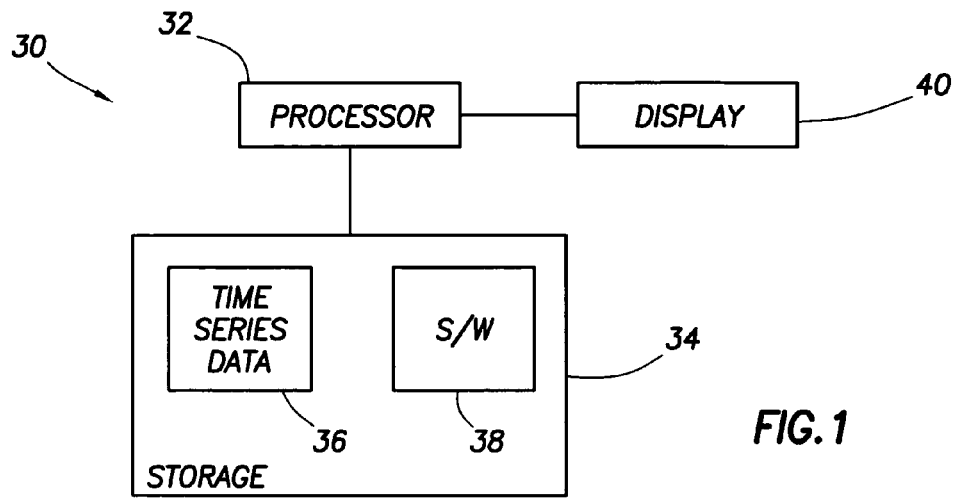
FIG. 1 shows a system in accordance with embodiments of the invention.

FIG. 1 illustrates a system 30 comprising a processor 32, storage 34, and a display 40. The processor 32 accesses the storage 34 to execute software 38 contained therein and to access data 36. In at least some embodiments, the data 36 comprises one or more time series data sets (e.g., sales of products over a period of time). The processor 32 renders information including or pertaining to the data 36 on the display 40. In at least some embodiments, the system 30 comprises a computer. The storage 34 may comprise volatile storage (e.g., random access memory), non-volatile storage (e.g., a compact disk, a hard disk drive), or a combination thereof.

The software 38 is executed by the processor 32 to perform some, or all, of the functionality described herein. The time series data 36 is accessed by the processor 32 during the execution of the software 38. As will be explained below, the processor 32, executing the software 38, determines the importance of one or more aspects of the time series data 36 and displays the data graphically on display 40 in a manner that emphasizes the importance of the data. Although the input time series data 36 is shown as being resident on storage 34, in some embodiments, the input time series data 36 may be received by the system 30 via a network (not specifically shown).

Figure 2:
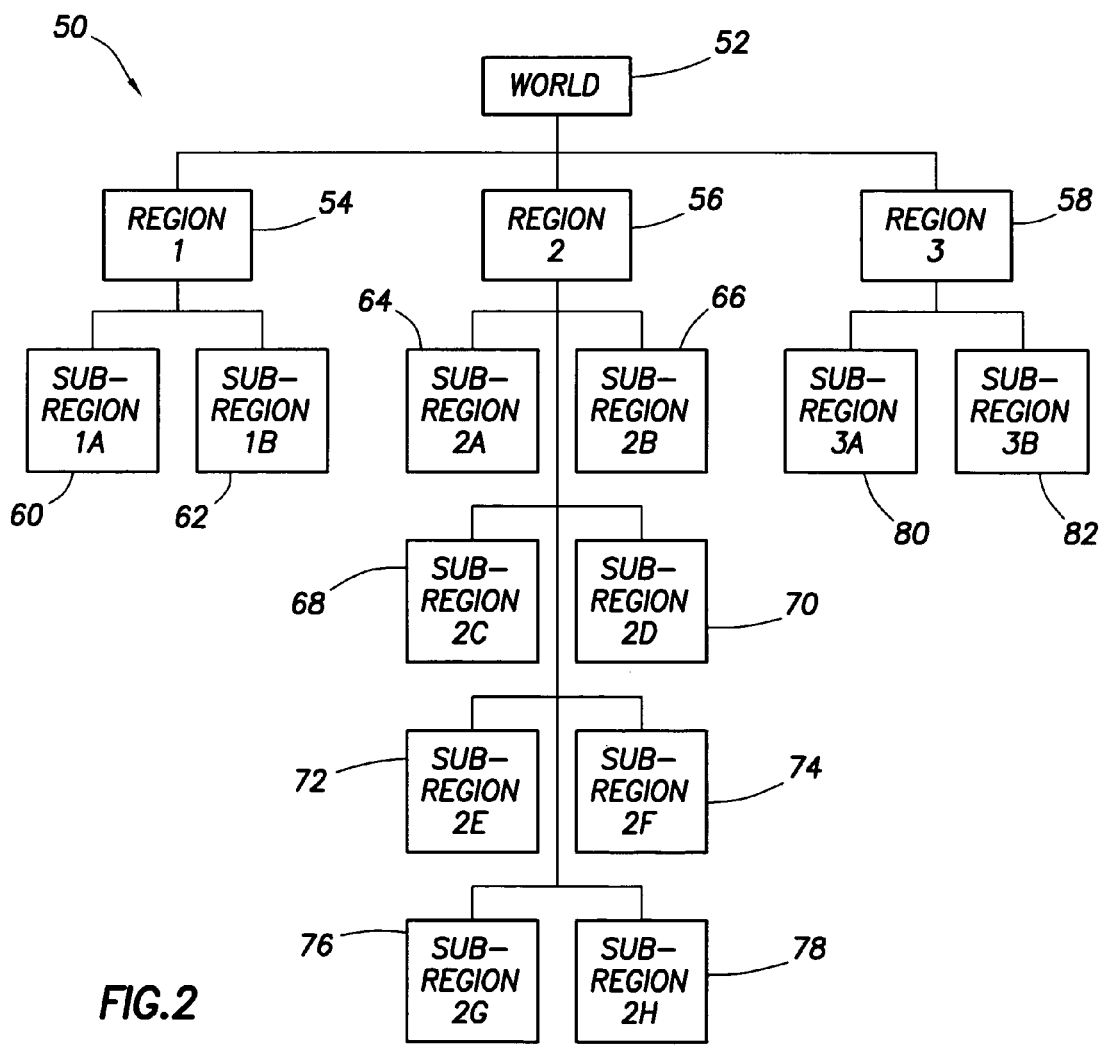
FIG. 2 shows an exemplary tree representation of sales data.

An exemplary time series data 36 comprises sales data of products over a period of time and by region across the globe. FIG. 2 illustrates a "tree" representation 50 of the exemplary data. The tree 50 of FIG. 2 defines the various sales regions that a sales-oriented organization might have. The root of the tree is the "world" node 52, which represents all of the data. The first level below the world node 52 distinguishes three regions, namely, a Region 1 node 54, a Region 2 node 56, and a Region 3 node 58. In the example of FIG. 2, each of the nodes 54, 56, and 58 contains two or more sub-region nodes. For example, the region node 54 contains nodes 60 and 62 designated as Sub-region 1A and Sub-region 1B, respectively. This means that the sales for Region 1 are sub-divided into sales for Sub-region 1A and Sub-region 1B. Similarly, the Region 2 node 56 has sub-regions that are represented by nodes 64-78. Node 64 corresponds to Sub-region 2A. Node 66 corresponds to Sub-region 2B. Node 68 corresponds to Sub-region 2C. Node 70 corresponds to Sub-region 2D. Node 72 corresponds to Sub-region 2E. Node 74 corresponds to Sub-region 2F and nodes 76 and 78 correspond to the Sub-regions 2G and 2H, respectively. The Region 3 node 58 contains two sub-region nodes 80 and 82 that correspond to Sub-regions 3A and 3B, respectively. In this example, there are three levels of nodes—a top node 52 (world), a second level of inner tree nodes 54-58 and a third level of leaf nodes 60-82. In other examples and thus in other embodiments of the invention, a different number of levels of nodes can be implemented.

The three main region nodes—Region 1 node 54, Region 2 node 56, and Region 3 node 58—are referred to as "inner tree nodes" and contain various constituent nodes 60-82. The bottom-most nodes of the tree—nodes 60-82—represent "leaf nodes" because those nodes do not have any constituent nodes. The leaf nodes contain the actual sales data. Sales from the various constituent nodes can be aggregated to determine sales from the higher level inner tree nodes.

Figure 3:
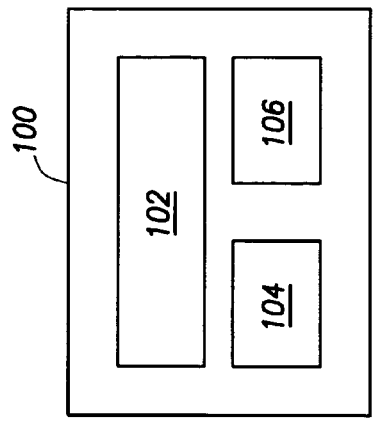
FIG. 3 depicts an exemplary display surface using an uneven mask in accordance with embodiments of the invention.

FIG. 3 shows an exemplary graphical layout of the time series sales data comprising the various nodes of tree 50 in accordance with an importance measure associated with the data. The importance measure and the method of generating the graphical layout will be discussed below following a description of the exemplary graphical layout of FIG. 3.

FIG. 3 shows a display surface 100 that is shown on display 40. The display surface may be, for example, a graphical window on the display. Three graphics 102, 104, and 106 are shown on the display surface. Each graphic may comprise a shape such as a rectangle, triangle, circle, oval, etc. The examples discussed below are presented in the form of rectangles. Data corresponding to each of the three inner tree nodes 54-58 is displayed in each of the three rectangles 102-106. As can be seen rectangle 102 is larger than rectangles 104 and 106, thereby indicating in accordance with embodiments of the invention, that the data in rectangle 102 is considered to be at least as important as, if not more important than, the data in rectangles 104 and 106. The vertical orientation of the rectangles can be reversed in other embodiments meaning that the larger rectangle 102 could be located beneath smaller rectangles 104 and 106. The determination of importance of a data set will be described below.

FIG. 3 also shows that rectangles 104 and 106 are of the same, or at least approximately the same, size with rectangle 104 located to the left of rectangle 106. Between two rectangles of equal or approximately equal size, the relative location of the rectangles also indicates a difference in the importance of the data contained therein. In the examples discussed below, a rectangle to the left of another rectangle is considered to have data that is more important than, or at least as important as, the other rectangle. Consequently, data in rectangle 104 is considered to be more important than data in rectangle 106. In other embodiments, right-most rectangles may be considered to contain more important data.

Data is thus graphically depicted on the display surface in a manner that indicates the importance of the data. Moreover, importance of data is reflected by both the relative size and relative location of the various rectangles on the screen.

Figure 4:
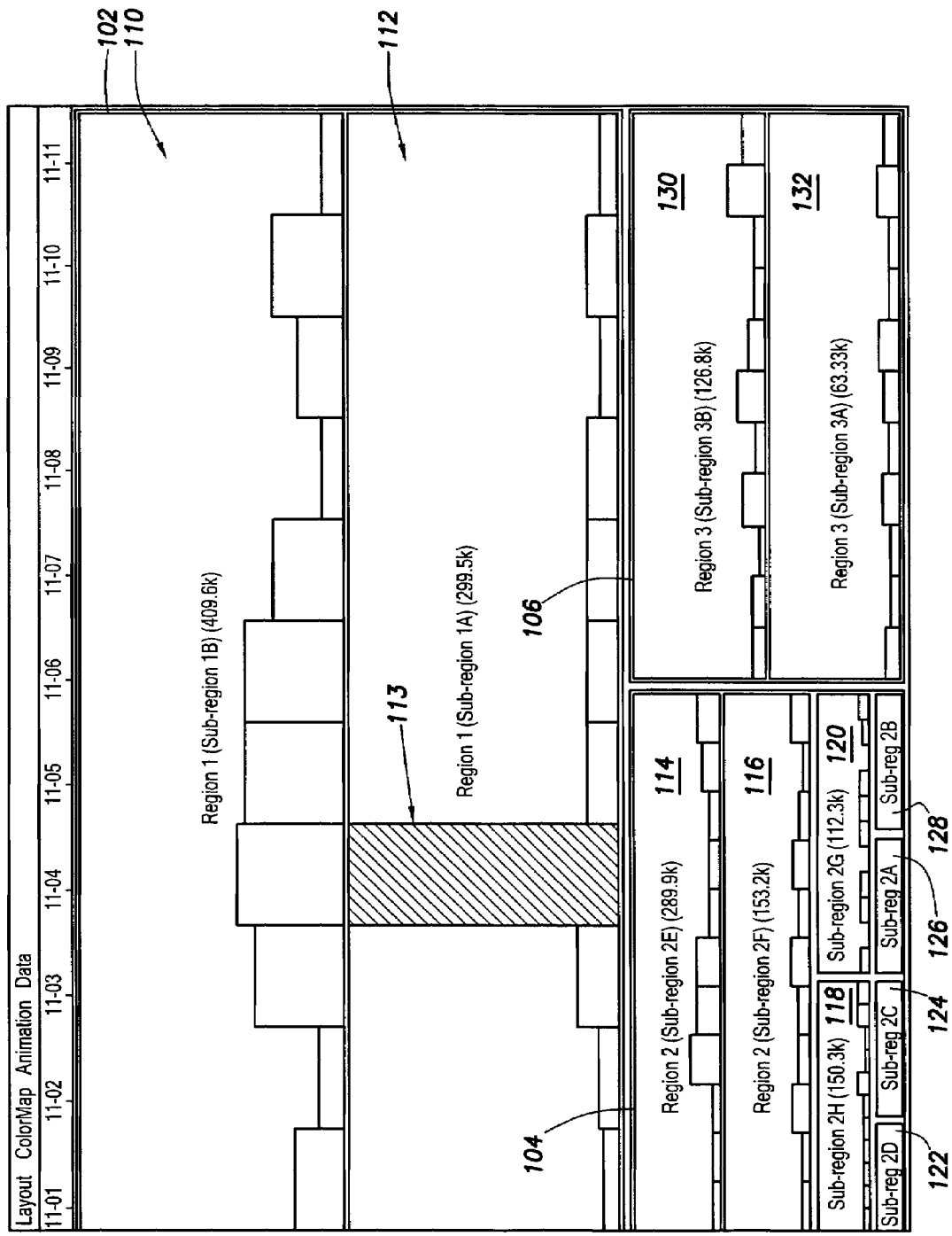
FIG. 4 depicts the display surface of FIG. 3 in which various time series data sets have been rendered in accordance with embodiments of the invention.

In FIG. 4, the time series data associated with each node in the exemplary tree 50 of FIG. 2 is shown in the various rectangles 102, 104, and 106. Each time series data set in the example of FIG. 4 comprises sales data across a plurality of days. In particular, sales data for the date range of November 1 through November 11 is shown. For each day, the total sales (measured in units of money) is shown in bar chart form. The height of the bars vary from day to day as the amount of sales fluctuate from day to day. If desired, variable color or variable shading can be rendered in the various bars. The coloring or shading can be determined in accordance with the data value associated with bar. In other embodiments, representations other than bar charts can be used. As can be seen, the largest rectangle 102 is rendered with time series data from the Region 1 node 54. This data is considered to be at least as, if not more important than, the data for the Region 2 and Region 3 nodes 56 and 58. Between the Region 3 nodes 56 and 58, the time series data of the Region 2 node 56 is determined to be at least as, if not, more important than the time series data associated with the Region 3 node 58. Accordingly, the more important data associated with Europe node 56 is located in the left-hand rectangle 104 and the less important data associated with the Region 3 node 58 is located in the right-hand rectangle 106.

The top-most rectangle 102 itself of FIG. 4 comprises two rectangles 110 and 112, with rectangle 110 located above rectangle 112. Within the top-most rectangle 102, time series data corresponding to the Sub-region 1B leaf node 62 is shown in the upper rectangle 110. Time series data corresponding to the Sub-region 1A node 60 is shown in the lower rectangle 112. The relative location of the two time series data sets for Sub-regions 1A and 1B reflects the relative importance of those two data sets. In particular, the data associated with Sub-region 1B is determined to be more important than, or at least as important as, the data associated with Sub-region 1A and, for that reason, is located in the upper rectangle 110.

A comparable concept applies to the time series data sets shown in rectangle 104 as well. Sales data for the Region 2 inner tree node 56 is shown in bar chart form in rectangle 104. As shown in the tree 50 of FIG. 2, the Region 2 node 56 comprises eight leaf nodes (Sub-regions 2A-2H). The sales data that corresponds to each of the eight leaf nodes is shown in eight separate rectangles 114-128 within the rectangle 104. Some of the Region 2 data is determined to be more important than other data. In general, more important data is shown in larger rectangles located at the upper portion of rectangle 104. In the example of FIG. 4, sales data associated with the Sub-regions 2E and 2F are more important than the sales data from the other Region 2 sub-region nodes. As such, the rectangles 114 and 116, which contain sales data from Sub-region 2E and 2F, are larger than and are located above the remaining rectangles 118-128. Sales data for the Sub-regions 2H and 2G nodes are of lesser importance and located below rectangle 116 with the left-most rectangle 118 indicating that the Sub-region 2H sales data is more important than the Sub-region 2G sales data. Similarly, sales data for Sub-regions 2D, 2C, 2A, and 2B are of lesser importance still and thus are shown at the bottom in rectangles 122-128.

The Region 3 inner node 58 contains two leaf nodes—Sub-regions 3A and 3B—as noted above. Thus, rectangle 106 in FIG. 4 includes two rectangles 130 and 132 to show the sales data from each Region 3's two leaf nodes. The sales data associated with Sub-region 3B sales is determined to be more important than Sub-region 3A specific sales. Accordingly, Sub-region 3B sales data is included in the upper rectangle 130 and the Sub-region 3A sales data is shown in the lower rectangle 132.

The aspect (or spatial) ratios of each rectangle containing time series data is computed by the software 38 so as to present the data graphically on the display in a way that is makes it easy to be viewed. Because the contents of each rectangle on the display is time series data (i.e., a plurality of data points plotted on the y-axis versus time on the x-axis), each rectangle in at least some embodiments is wider than it is tall as shown in FIG. 4.

The determination of an importance value for the time series data associated with each leaf node 60-82 can be performed in accordance with various formulations. In accordance with at least one embodiment, importance of a time series data set is calculated as the average of the data set across the relevant time period. Referring to FIG. 4, for example, the average of the Sub-region 1B sales from November 1$^{st}$ through November 11$^{th}$ is calculated to be $409,600 (shown in parentheses in rectangle 110). Thus, a time series data set whose average value is larger than another time series data set is determined to be of greater importance than the data set with the smaller average value. Within each of the rectangles that correspond to the three inner tree nodes 54-58, time series data sets corresponding to each of the constituent leaf nodes are arranged, as described above, based on an importance value which, in at least some embodiments, is the average value of each data set. Other techniques for determining an importance value comprises calculating the median of the series data, maximum value of the series data, summation of each series data, and the rate of change of a series data set. The rate of change of a series data set can be determined for example, by determining the first derivative of the data. In some embodiments, the average rate of change is determined across a particular data set and the importance value is represented by the average rate of change. In the case of median or maximum value calculations, the median or maximum value will represent the importance value.

Because the time series data set for a leaf node comprises data over a specified period of time, the importance value determined for a leaf node will vary as the time period associated with the leaf node's data set varies. Thus, while Sub-region 1B may have data determined to be more important than Sub-region 1A for the time period November 1$^{st}$ through November 11$^{th}$, Sub-region 1A sales may be determined to be more important for different periods of time. Accordingly, the graphical depiction of the time series data sets for the various nodes can be re-run whenever desired and for different time periods to see changes in the relative importance of the data. In some embodiments, the algorithm described herein can be run continuously and thus continuously and automatically update the graphical depictions as new data are received. New received data, in fact, may result in a data set that was previously determined to be most important to now be determined to be less important than other data sets. The graphical depictions can then automatically change to reflect this change in importance.

In addition to determining an importance value for the time series data set of each leaf node, an importance value of each inner tree node is also determined. In at least some embodiments, the inner tree nodes' importance value are computed as an aggregation of the importance values of the constituent leaf nodes. For example, an importance value for the Region 1 inner tree node 54 is aggregated from importance values determined for the Sub-region 1A and 1B leaf nodes 60 and 62. Similarly, an importance value for the Region 2 inner tree node 56 is aggregated from importance values determined for Region 2's constituent leaf nodes 64-78. The importance value for the Region 3 node 58 is aggregated from importance values determined for constituent leaf nodes 80 and 82. If desired, the aggregated values for the three inner tree nodes 54-58 can themselves be aggregated to compute an importance value for the top-most inner tree node 52 (world). The aggregated inner tree node importance values are used to determine how the various inner tree node data is to populate the rectangles 102-106 on the display surface 100.

Any of multiple techniques are possible for aggregating leaf node importance values to compute inner tree node importance value. For example, the following equation can be used to aggregate leaf node importance values:

$$I(agg) = s*I(1) + (1-s)*\left(\sum_{i=2}^{m} \frac{sizeof(i)}{\sum_{j=2}^{m} sizeof(j)} I(i)\right) \quad (1)$$

where l(1) is the largest importance value of any of an inner tree node's constituent leaf node data sets, s represents a weighting factor, m is the number of nodes, and i and j are indices. In general, s is a value that is set between 0 and 1. In some embodiments, s is set a value of 0.5. The left-hand term in Equation (1) (s*l(1)) weights the maximum importance value by s. The right-hand term computes the size-weighted average of the remaining (non-largest) importance values. The "size" of a time series data set is defined by the number of data values in the time series data set for which the importance value is being determined.

In general, equation (1) permits the importance value of a non-leaf node to be computed by trading off the largest importance measure value of that node's constituent leaf nodes against a weighted average of all of the importance values of the constituent nodes. Weighting is performed by the size of the constituent leaf nodes.

In a second aggregation technique, the importance value of an inner tree node is determined by computing an unweighted average of the importance values of the node's constituent nodes. In this technique, the importance value of an inner tree node is computed as follows:

$$I(agg) = \frac{1}{m} * \sum_{i=1}^{m} I(i) \quad (2)$$

where m from Equation 2 is the number of data values in the time series data set.

A third aggregation technique involves summing together the importance values of an inner node's constituent nodes. In this technique, the importance value of an inner tree node is computed as follows:

$$I(agg) = \sum_{i=1}^{m} I(i) \quad (3)$$

Figure 7:
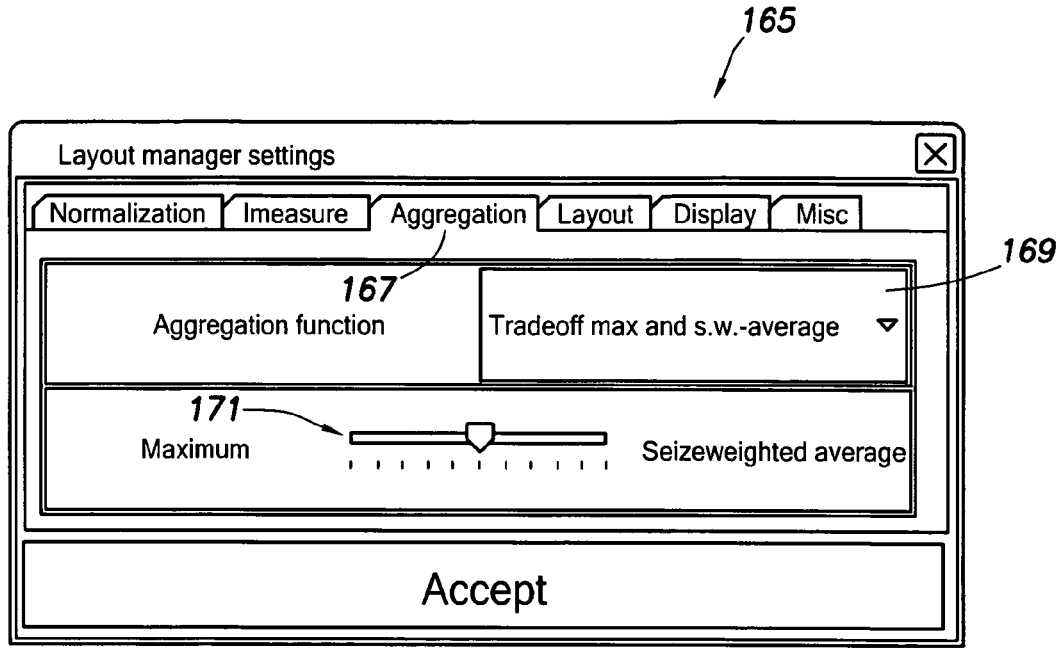
FIG. 7 shows a graphical user interface (GUI) in accordance with embodiments of the invention to select an aggregation function.

In at least some embodiments, the software 38 can be used to select one of a plurality of possible aggregation techniques. FIG. 7 shows a graphical user interface (GUI) 165 that is shown on display 50 during execution of software 38. The GUI includes a plurality of selectable "tabs." The aggregation tab 167 has been selected. An aggregation technique can be selected via a drop-down menu 169. In the example of FIG. 7, the aggregation function of equation (1) above has been selected. The value of "s" in equation (1) is selected via slider control 171. Moving the slider all of the way to the left results in a value of s of 0. Moving the slider all of the way to the right results in a value of s of 1. In the example of FIG. 7, the slider has been set in the middle of the range thereby resulting in a value of s of 0.5.

Figure 5:
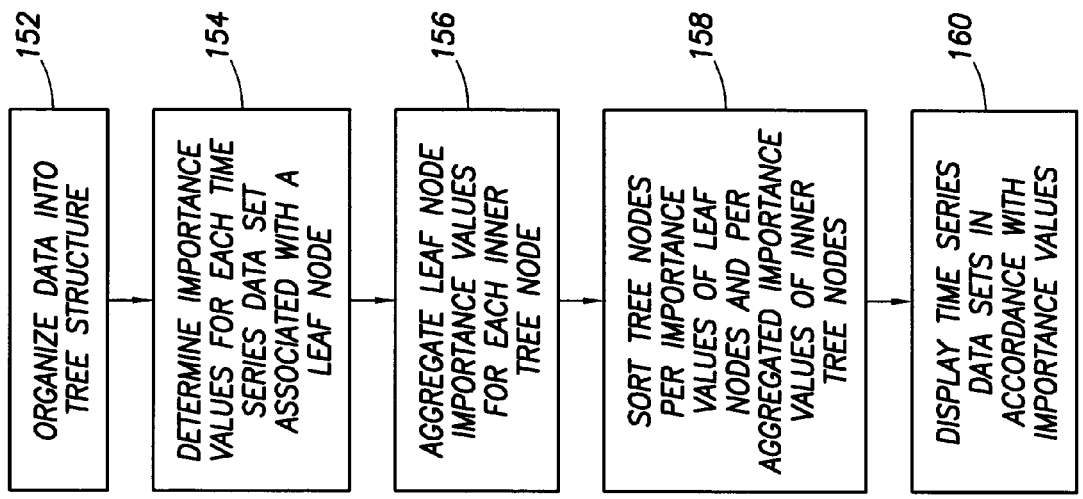
FIG. 5 shows a method in accordance with embodiments of the invention.

FIG. 5 provides a method in accordance with embodiments of the invention. At 152, the various time series data sets are organized into a tree structure as described above. This action can be performed by using pointers to link together the data in the various nodes. At 154, the method comprises determining importance values for each time series data set associated with a leaf node. In some embodiments, this determination comprises calculating the average of the date in a leaf node across the relevant time period. At 156, the method comprises aggregating the leaf nodes' importance values for each inner tree node. At 158, the method comprises sorting the tree's nodes in accordance with the importance values determined in 154 and 156. This act of sorting can be performed in ascending or descending order. Finally, at 160 the time series data of the various leaf nodes are shown on the display surface 100 in accordance with the importance values as described above.

In the embodiments of FIGS. 3 and 4, Region 1 sales data is represented in a rectangle 102 that is larger than the other rectangles 104 and 106 so as to emphasize the difference in the importance of the various time series data sets. The size and layout of the rectangles 102-106 is referred to as a "mask." The mask of FIG. 3 is referred to as an "uneven" mask in that there is an odd number of rectangles and at least one of the rectangles is larger than at least one other rectangle. While an uneven mask can be used in any situation, it is particularly useful when there is a significant difference between aggregated importance values of the various inner nodes.

Figure 6:
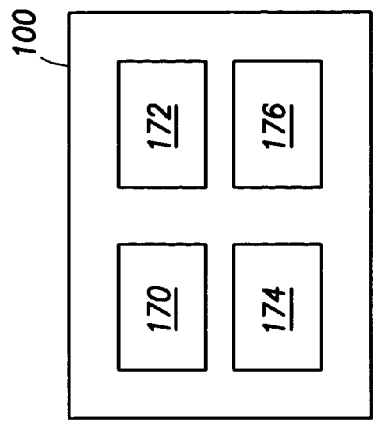
FIG. 6 depicts an exemplary display surface using an even mask in accordance with embodiments of the invention.

FIG. 6 shows an "even" mask in that there is an even number of rectangles 170, 172, 174, and 176 and all rectangles are of the same size. Differences in importance of the various data sets is signified by the relative location of the rectangles. That is, the data in the upper row of rectangles 170 and 172 is as, or more, important than the data in the lower rectangles 174 and 176. Further, the data in the left-hand rectangle 170 is as, or more, important than the data in the right-hand rectangle 172. While an even mask can be used in any situation, it is particularly useful when no or little significant difference exists between aggregated importance values of the various inner nodes. For embodiments with more than four rectangles being shown, groups of four rectangles are provided of the same size, but the size of the rectangles between groups may differ. For example, if there are six rectangles, then four of the same size and grouped together as shown in FIG. 6. The remaining two are of the same size, but smaller than the four in the primary group.

If desired, the software 38 can automatically determine the type of mask to use (even or uneven) based on a calculation of the "skewness" of the data which is indicative of the amount of difference between the various importance values. In at least some embodiments, the software 38 computes a skewness value based on the various importance values for an inner node's constituent nodes. The Pearson Mode Skewness (PMS) test can be used in this regard. The PMS test is computed using the following formula:

$$PMS(I) = \frac{3mean(I) - median(I)}{\sigma(I)} \quad (4)$$

where $I = i_1, \ldots, i_n$ which represents the distribution of the importance values for the n child nodes of an inner tree node, and $\sigma$ is the PMS "threshold" (discussed below). In at least some embodiments, $\sigma$ can be a value selected from among 0, 5, 10, 20, and 25, although $\sigma$ can be different in other embodiments. The term "3mean(I)" is three times the average of the input importance values and the term median(I) is the median of the input importance value data set. A set of importance values that has a high degree of variability results in a PMS(I) that is larger than an importance value data set that does not have as much variability. Thus, the resulting PMS(I) value indicates the degree of variability of the various importance value. If desired, the PMS(I) value can be computed and used by the software 38, to determine whether an even or uneven mask should be used to show the data based on importance. The software 38 calculates the PMS(I) value using equation (4) above and, based on the calculated PMS(I), determines whether to use an even mask or an uneven mask. A threshold ($\sigma$) for the PMS(I) value can be hard-coded or programmed into the software to determine when an uneven mask should be used and when an even mask should be used.

Figure 8:
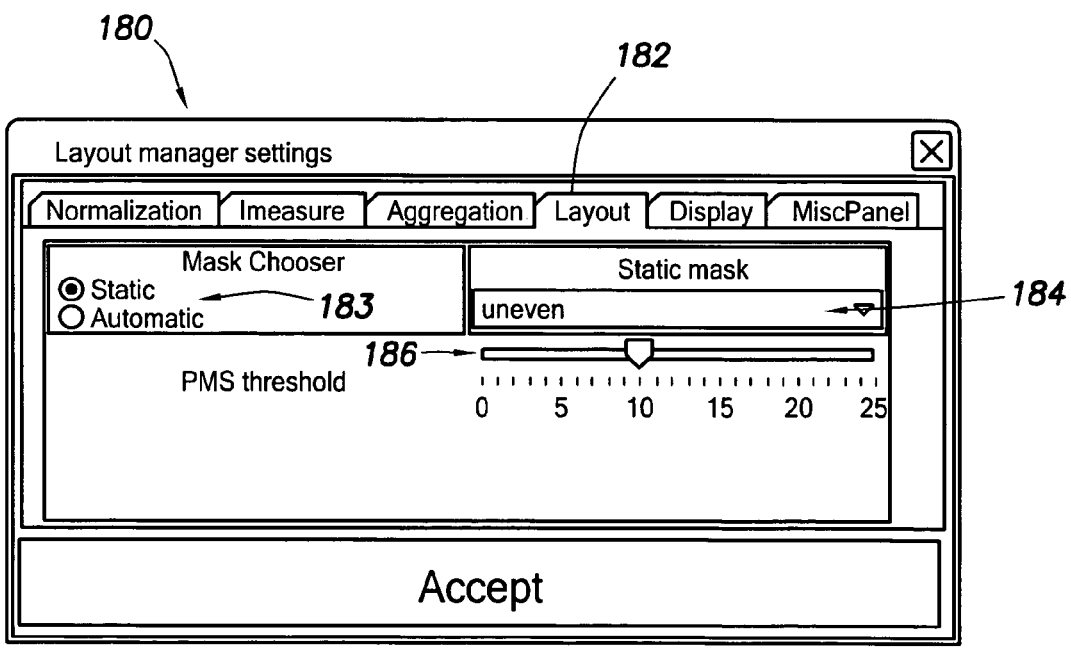
FIG. 8 shows a graphical user interface (GUI) in accordance with embodiments of the invention to select a layout mask.

FIG. 8 shows a GUI 180 that is shown on display 50 during execution of software 38. The GUI includes a plurality of selectable "tabs." The "layout" tab 182 permits a user to select the mask to be either "static" or "automatic." FIG. 8 illustrates that the user has selected "static" at the mask chooser 183. A static mask selection means that the user selects a specific mask type as even or uneven (uneven has been chosen at selection 184 in FIG. 8) and the user-selected mask type is not permitted to change.

If, however, the user desires to permit the software 38 to select a mask type based on the skewness of the importance values (as explained above), the user can select "automatic" for the mask chooser 183. The PMS threshold slider control 186 permits a user to select the threshold ($\sigma$) below which an even mask is automatically implemented and above which an uneven mask is automatically implemented. The skewness and resulting mask selection can be applied to the main rectangles shown on the display (e.g., rectangles 102, 104, and 106 in FIG. 4) and also among the various rectangles comprising sub-rectangles (e.g., rectangles 114-128 within the Region 2 display region). With "automatic" selected, the mask that is automatically selected for the overall layout of the major nodes can be the same or different than the mask that is automatically selected for the rectangles within a sub-rectangle. That is, the mask of the main rectangles could be in accordance with an uneven layout, but the mask of the rectangles within a sub-rectangle could be in accordance with an even layout.

Figure 9:
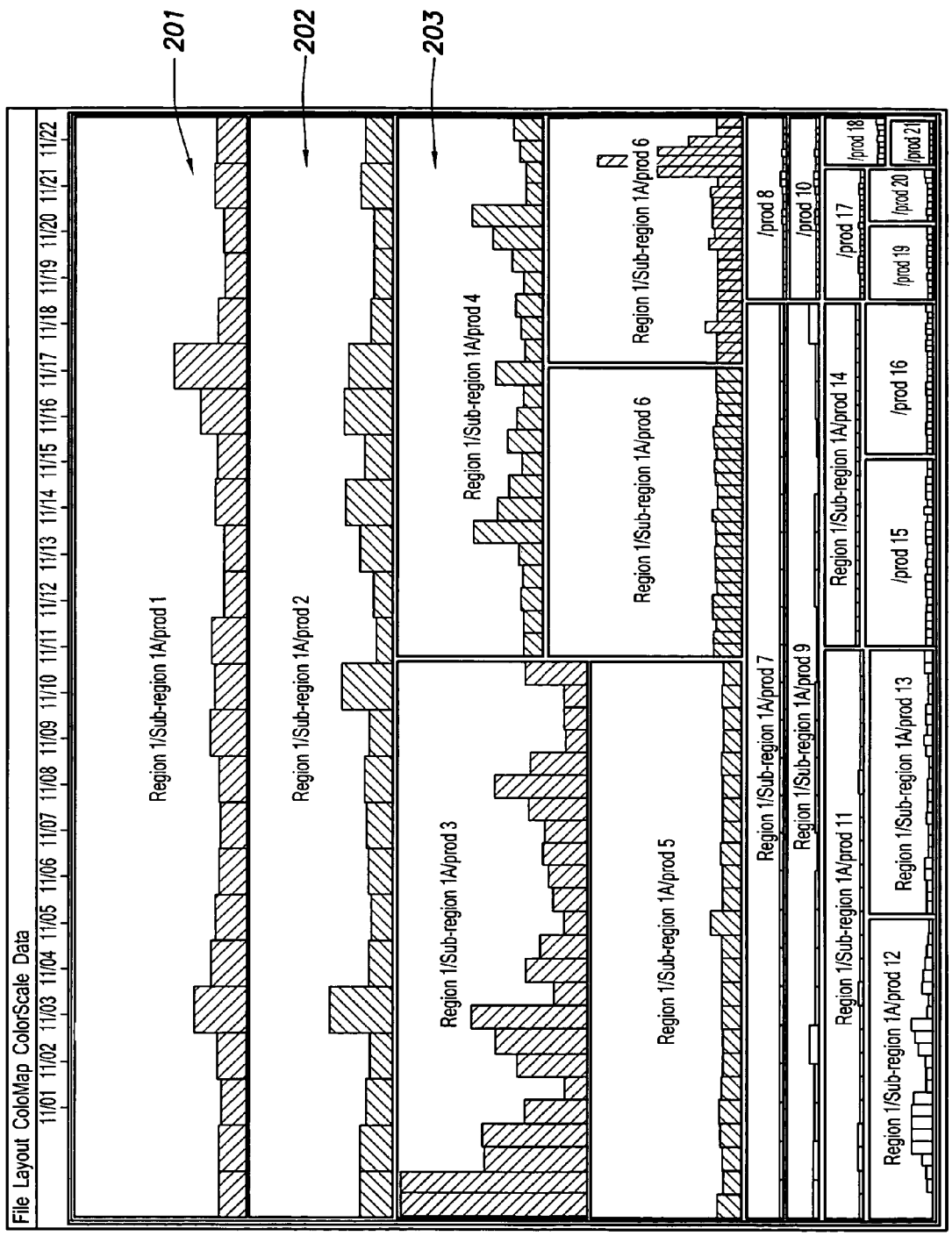
FIG. 9 shows an exemplary embodiment of providing more detailed information about one of the nodes.

A user may desire to obtain more detailed information about one of the nodes whose data is depicted in, for example, the graphical layout of FIG. 4. For example, November 4$^{th}$ shows a relatively large "spike" in sales for Sub-region 1A. A user, seeing the spike in the graphical layout of FIG. 4 might want to see additional information regarding the Sub-region 1A sales for that particular day. The user can select the Sub-region 1A sales for that particular day by, for example, using a mouse to click on the bar 113 (see FIG. 4). Once selected, the software 38 will generate a new graphics window or replace the graphics window of FIG. 4 with a new window containing sales information regarding the data that represents bar 113. FIG. 9 shows an example of what that might look like. All of the data in FIG. 9 pertains to Sub-region 1A. In this example, multiple products are sold in Sub-region 1A and each rectangle, such as rectangles 201, 202, 203, pertains to a different product. While not shown in FIG. 9, Information can be included in each rectangle to indicate the product to which that rectangle pertains. Alternatively, the user can move the mouse cursor over a particular rectangle and the product associated with that rectangle will appear on the screen.

If desired, the additional information can be rendered on the display 40 in a manner consistent with the importance value-based embodiments discussed above. That is, an importance value can be determined for each product in Sub-region 1A (using the example of FIG. 9). An importance value can be computed for each product by averaging together the sales for the product across the relevant time period. As before, product data is laid out on the display in a top-to-bottom and left-to-right orientation based on the importance values.

In at least some embodiments, the following pseudo-code algorithm can be used to draw the time series data on the display. The algorithm uses a set M of layout masks, were each $M_i \epsilon M$ defines an ordered partition of a rectangular display space R into $n=|M_i|$ sub-rectangles $\{R_1(M_i,R), \ldots, R_n(M_i,R)\}$.

The layout is generated by calling the procedure ID_Map (root, display), where "root" denotes the root node of an ordered tree T (see for example FIG. 2) and "display" is the main display rectangle that surrounds all of the time series data set sub-rectangles.

Global: <Set of Masks>M;

Procedure ID_Map (<List of nodes>L, <DisplayRectangle>R) {
    // terminal node reached: render the time series
    If (L contains exactly one leaf node) {
        drawTimeSeries(L(0).ts, R);
        return;
    }
    // single inner node reached: recurse with children
    If (L contains exactly one non-leaf node) {
        ID_map(L(0).children, R);
        return;
    }
    // list of nodes: map to display partitions and recurse
    if automatic mask chooser is selected, choose mask MS from M such that MS best represents the distribution of i-measures from the nodes in L;
    Partition L into n equal-sized, ordered chunks of nodes $C_1, \ldots, C_n$, where n=|MS|;
    For (i=1; i<=n; i++) {
        ID_map($C_i$, $R_i$(MS, R));
    }
}

The embodiments described above can be used to analyze a "snapshot" of a set of data. Alternatively, the embodiments can be used to continuously analyze incoming data in an automated fashion in which the user would see the graphical representation automatically be updated. Further, the embodiments described herein can be used to show data based on importance on a single display without overlap of the various data representations. That is, each rectangle is dedicated for use by a particular subset of the data and the rectangles do not overlap.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
    determining, by a computer, an importance value for each time series data set from among a plurality of time series data sets, wherein the importance value for each time series data set is calculated based on content of at least a portion of the corresponding time series data set;
    visually representing, on a display, said time series data sets in accordance with the corresponding calculated importance values, wherein visually representing said time series data sets in accordance with the corresponding calculated importance values comprises allocating areas on the display to the time series data sets in accordance with the calculated importance values; and
    aggregating corresponding groups of said calculated importance values into respective aggregated importance values, wherein each of the aggregated importance values corresponds to a respective group of the plurality of time series data sets,
    wherein visually representing each of said time series data sets is further based on the aggregated importance values.

2. The method of claim 1, wherein the size of each of the areas is associated with the calculated importance value of the corresponding time series data set.

3. The method of claim 1, wherein visually representing said time series data sets in accordance with the corresponding calculated importance values and aggregated importance values comprises positioning each corresponding area on the display based on the calculated importance value of the corresponding time series data set and the corresponding aggregated importance value.

4. The method of claim 1, further comprising selecting one of the time series data sets and visually representing information about the selected time series data set, wherein said information comprises multiple data items that are visually represented based on an importance associated with each data item.

5. The method of claim 1, wherein determining the importance value for each time series data set calculated based on the content of at least the portion of the corresponding time series data set comprises performing an action selected from the group consisting of computing an average, a median, a maximum value, and a rate of change associated with the content of at least the portion of the corresponding time series data set.

6. The method of claim 1, wherein visually representing each of said time series data sets comprises displaying a bar chart.

7. The method of claim 1, wherein visually representing each of said time series data sets comprises displaying a bar chart comprising a plurality of bars and wherein each bar is displayed using a variable color or variable shading that corresponds to a data value represented by the bar.

8. The method of claim 1, further comprising sorting said time series data sets based on said calculated importance values and said aggregated importance values.

9. The method of claim 1, wherein aggregating at least some of said calculated importance values comprises computing a value that is a function of both a maximum of said at least some calculated importance values and a weighted average of all of said at least some calculated importance values.

10. The method of claim 1, wherein aggregating at least some of said calculated importance values comprises aggregating selected from the group consisting of:
    calculating an average of said at least some of said calculated importance values; and
    summing together said at least some of said calculated importance values.

11. The method of claim 1, wherein each of said time series data sets is visually represented in a corresponding area of the display, and the method further comprises choosing whether the areas are all of the same size but positioned on the display in accordance with the calculated importance values and aggregated importance values or whether at least one of the areas is of a different size in accordance with the calculated importance values.

12. The method of claim 1, further comprising computing a variability value that is indicative of a variability associated with at least some of said calculated importance values.

13. The method of claim 12 further comprising using said variability value to determine how to visually represent each of the time series data sets.

14. The method of claim 1, further comprising configuring a size and location of a graphical representation of each of said time series data sets based on a comparison of the calculated importance values.

15. The method of claim 1, wherein each of the areas is a rectangle in which a time series data set is to be plotted, said rectangle, when viewed on the display, is longer horizontally than vertically.

16. The method of claim 1, wherein determining the importance value for each time series data set calculated based on the content of at least the portion of the corresponding time series data set comprises determining the importance value for each time series data set calculated based on the content within a particular time period of the corresponding time series data set.

17. A system, comprising:
a display;
a processor;
storage accessible by said processor, said storage containing software that upon execution on the processor causes said processor to determine an importance value for each series data set from among a plurality of series data sets and to visually represent, in the display, each of said series data sets in corresponding areas of a graphical layout, wherein the areas have characteristics based on the importance values, wherein the areas are contained in larger areas representing groups of the series data sets, and wherein the larger areas have characteristics based on aggregations of the importance values;
wherein said software upon execution further causes said processor to compute the aggregations of said importance values, wherein computing the aggregations is according to a technique selected from the group consisting of: calculating a value that is a function of a maximum of at least some importance values, calculating a value that is a function of a weighted average of all of said at least some importance values, calculating an average of said at least some of said importance values, and summing together said at least some of said importance values.

18. The system of claim 17 wherein the characteristics of the areas representing the corresponding series data sets comprise sizes of the areas that are dependent upon the importance values of the corresponding series data sets.

19. The system of claim 18 wherein the characteristics of the areas representing the corresponding series data sets further comprise positions of the areas on the display, wherein the positions of the areas are based on the importance values of the corresponding series data sets.

20. The system of claim 17 wherein the characteristics of the areas representing the corresponding series data sets comprise positions of the areas on the display, wherein the positions of the areas are based on the importance values of the corresponding series data sets.

21. The system of claim 17 wherein said software causing said processor to visually represent each of said series data sets causes said processor to display a bar chart.

22. The system of claim 17, wherein the importance value for each series data set is calculated based on content of at least a portion of the corresponding series data set.

23. The system of claim 22, wherein the plurality of series data sets comprise time series data sets, wherein the at least a portion is a particular time period, and wherein the importance value for each time series data set is calculated based on content within the particular time period of the corresponding time series data set.

24. The system of claim 17 wherein said software upon execution further causes said processor to compute the aggregations of said importance values, wherein the larger areas have characteristics based on the computed aggregations.

25. A system, comprising:
a display;
a processor;
storage accessible by said processor, said storage containing software that upon execution on the processor causes said processor to determine an importance value for each series data set from among a plurality of series data sets and to visually represent, in the display, each of said series data sets in corresponding areas of a graphical layout, wherein the areas have characteristics based on the importance values, wherein the areas are contained in larger areas representing groups of the series data sets, and wherein the larger areas have characteristics based on aggregations of the importance values;
wherein the software upon execution permits choosing whether the areas representing respective series data sets are all of the same size but positioned on the display in accordance with the importance values or whether at least one of the areas representing respective series data sets are of a different size in accordance with the importance values.

26. The system of claim 25 wherein the importance value for each series data set is determined by performing an action selected from the group consisting of computing an average, a median, a maximum value, and a rate of change associated with said series data set.

27. A system, comprising:
a display;
a processor;
storage accessible by said processor, said storage containing software that upon execution on the processor causes said processor to determine an importance value for each series data set from among a plurality of series data sets and to visually represent, in the display, each of said series data sets in corresponding areas of a graphical layout, wherein the areas have characteristics based on the importance values, wherein the areas are contained in larger areas representing groups of the series data sets, and wherein the larger areas have characteristics based on aggregations of the importance values;
wherein said software upon execution causes said processor to compute a variability value that is indicative of a variability associated with at least some of said importance values,
wherein said software upon execution causes said processor to use said variability value to determine how to visually represent each of the series data sets.

28. A processor-accessible storage medium containing instructions, which when executed by a processor, effect visually representing time series data sets, comprising:
determining an importance value for each time series data set from among a plurality of time series data sets, wherein the importance value for each time series data set is calculated based on content of at least a portion of the corresponding time series data set;
aggregating corresponding groups of said calculated importance values into respective aggregated importance values, wherein each of the aggregated importance values corresponds to a respective group of the plurality of time series data sets;

visually representing said time series data sets based on the corresponding calculated importance values and aggregated importance values, wherein visually representing said series data sets in accordance with the corresponding calculated importance values comprises allocating areas on a display to the time series data sets in accordance with the calculated importance values.

29. The processor-accessible storage medium of claim 28 wherein the size of each of the areas is associated with the calculated importance value of the corresponding time series data set.

30. The processor-accessible storage medium of claim 28 wherein a position of each of the areas on the display is based on the calculated importance value of the corresponding time series data set.

31. The processor-accessible storage medium of claim 28 wherein determining the importance value for each time series data set calculated based on the content of at least the portion of the corresponding time series data set comprises performing an action selected from the group consisting of computing an average, a median, a maximum value, and a rate of change associated with the content of at least the portion of the corresponding time series data set.

32. The processor-accessible storage medium of claim 28, wherein visually representing said time series data sets based on the aggregated importance values comprises populating data of said time series data sets in the areas based on the aggregated importance values.

33. The processor-accessible storage medium of claim 28, wherein determining the importance value for each time series data set calculated based on the content of at least a portion of the corresponding time series data set comprises determining the importance value for each time series data set calculated based on the content within a particular time period of the corresponding time series data set.

34. The processor-accessible storage medium of claim 28, wherein aggregating a particular one of the groups of calculated importance values is according to a technique selected from the group consisting of: calculating a value that is a function of a maximum of the calculated importance values in the particular group; calculating a value that is a function of a weighted average of the calculated importance values in the particular group; calculating an average of the calculated importance values in the particular group; and summing together the calculated importance values in the particular group.

35. A method, comprising:
determining, by a computer, an importance value for each time series data set from among a plurality of time series data sets, wherein the importance value for each time series data set is calculated based on content of at least a portion of the corresponding time series data set;

aggregating corresponding groups of said calculated importance values into respective aggregated importance values, wherein each of the aggregated importance values corresponds to a respective group of the plurality of time series data sets;

associating, by the computer, each time series data set with a computed graphic;

positioning the graphics on a display based on the corresponding calculated importance values for the time series data sets and the corresponding aggregated importance values; and visually representing, on the display, each of said time series data sets in each corresponding graphic.

36. The method of claim 35 wherein the graphics comprise a shape selected from a group consisting of rectangles, triangles, circles and ovals.

37. The method of claim 35, wherein aggregating a particular one of the groups of calculated importance values is according to a technique selected from the group consisting of: calculating a value that is a function of a maximum of the calculated importance values in the particular group; calculating a value that is a function of a weighted average of the calculated importance values in the particular group; calculating an average of the calculated importance values in the particular group; and summing together the calculated importance values in the particular group.

* * * * *